May 23, 1961 J. F. McMAHON, JR., ET AL 2,985,806

Filed Dec. 24, 1958 SEMICONDUCTOR FABRICATION 2 Sheets-Sheet 1

INVENTORS
FORD K. CLARKE
HARRY K. ISHLER
JOHN F. McMAHON, JR.

BY [signature]

AGENT

SEMICONDUCTOR FABRICATION

Filed Dec. 24, 1958 2 Sheets-Sheet 2

INVENTORS
FORD K. CLARKE
HARRY K. ISHLER
JOHN F. MCMAHON, JR.
BY
Carl H. Synnestvedt
AGENT United States Patent Office 2,985,806

Patented May 23, 1961

2,985,806

SEMICONDUCTOR FABRICATION

John F. McMahon, Jr., Lansdale, Ford K. Clarke, Chalfont, and Harry K. Ishler, Lansdale, Pa., assignors to Philco Corporation, Philadelphia, Pa., a corporation of Pennsylvania Filed Dec. 24, 1958, Ser. No. 782,822

6 Claims. (Cl. 317—235)

This invention relates generally to the semiconductor art and more particularly to an improved hermetically housed semiconductor device.

The extensive and expanding use of electronics in both military and industrial applications, and the need for further reduction in the weight and size of present day electronic equipment has given rise to an increasing demand for greater miniaturization of electrical components. Moreover, the efficient utilization of available space, and a higher concentration, or density of electronic components per unit volume, are factors of extreme importance in a widening spectrum of critical applications, as for example in rocket and satellite instrumentation, data processing equipment, and similar applications.

Accordingly it is an object of the present invention to provide a unique, hermetically housed semiconductor device of extreme structural compactness resulting in a substantial reduction in the weight and size of such units.

To insure optimum performance of semiconductor devices over a substantial period of time it is generally necessary to provide some type of hermetic encapsulation, a typical construction, for example, comprising a single ended, cup-shaped, metal envelope which partially encloses the semiconductor device leaving one end open. The opening is subsequently sealed by a suitable closure, as for example a stem assembly comprising an insulating core or matrix of vitreous, ceramic or other suitable material, the insulating core or matrix being traversed by leads providing electrical accessibility to the encapsulated portions of the electrical system.

One of the largest single factors contributing to the overall size of an encapsulated semiconductor device is the size of the stem assembly required to effect hermetic juncture between the lead-in filaments and glass matrix, it having been found, with previous constructions, that a sealing depth of at least 50 mils is required to produce a reliable hermetic seal with sufficient mechanical strength. Attempts to reduce the depth of the seal below this figure have been unsuccessful.

Reduction in the size of encapsulated semiconductor devices is additionally complicated by the fact that during normal operation a considerable quantity of heat is generated within the rectifying regions of the device. This has necessitated a housing of relatively large surface area to afford adequate dissipation of the generated power to avoid excessive thermal loading.

It is consequently a more particularized object of the present invention to provide a unique, hermetically housed semiconductor device which overcomes the aforesaid limitations of the prior art.

It is a further object of the present invention to provide a compact, hermetically housed semiconductor device capable of improved heat dissipation through incorporation of novel sealing means.

It is a still further object of the present invention to provide an improved, minimal depth seal for encapsulated semiconductor devices.

These, and other objects and features of the present invention will be apparent from a consideration of the following detailed description taken in conjunction with the accompanying drawings, in which.

Figure 1:
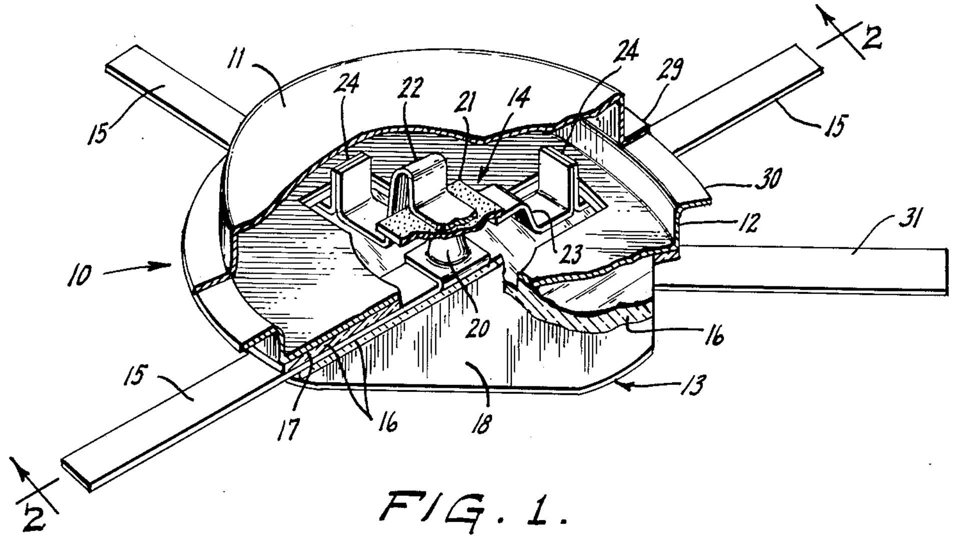
Figure 1 is a fragmentary perspective view showing an encapsulated transistor embodying features of the present invention.

Referring in greater detail to Figure 1, there is shown a hermetically housed semiconductor device 10 comprising the flanged top shield 11, an apertured sealing dish 12 and a glass-surfaced lower shield 13, these members jointly serving to hermetically encapsulate the transistor triode assembly 14. Electrical accessibility to the transistor assembly is provided by a unique, substantially coplanar array of radially disposed, ribbon-like leads 15 hermetically encased in a common lamina of glass or other suitable insulating material 16.

To effect optimum reduction in the thickness or depth of the seal the leads 15 are made as thin as possible and brought out through the sealing media 16 in substantially coplanar array. By this technique the thickness of the seal is effectively limited to that required for a one lead system. To insure a seal of sufficient mechanical strength utilizing this construction requires merely that the radial length of the seal be sufficiently long, the seal thickness or "depth" remaining unchanged. As an additional refinement, the radial length of the seal required to produce an effective hermetic bond with the required mechanical strength may be substantially reduced by choosing a lead cross-sectional configuration providing increased surface contact between the lead and glass matrix, as for example, the rectangular cross-sectional configuration of leads 15. This configuration not only enhances the mechanical strength of the seal, but importantly provides an increased area of heat transfer between the heat conducting leads 15 and the insulating media 16. Reducing the thickness of the insulating interfaces separating the leads 15 from the flanking metallic surfaces 17 and 18 materially improves the conduction of heat from the leads to the heat-radiative encasing structure. By these novel, yet simple expedients, a ten fold compression in the overall height of a conventional hermetically housed semiconductor device is made possible without impairment of operating standards. Encapsulated transistors have been made by this technique with an overall height of only 30 mils, the depth of the required seal being merely 10 mils, or less than 1/64 of an inch in thickness. In considering the drawings, these minute dimensions should be had clearly in mind, in order that the substantial advantages of the new construction may be fully appreciated.

Figure 2:
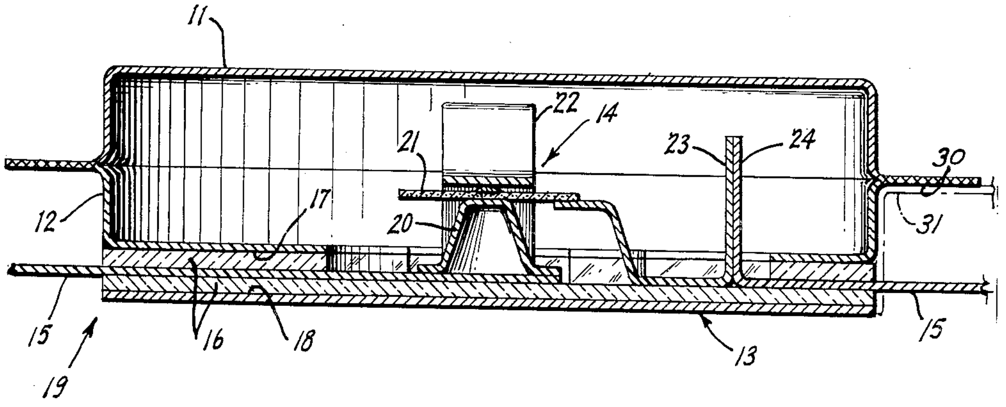
Figure 2 is a sectional elevation of the transistor shown in Figure 1 as viewed along the cutting plane 2—2.

Figure 2 shows this unique construction in enlarged sectional view, the composite laminar sealing structure 19 as well as the vertical dimensioning being shown on an exaggerated scale for purposes of illustration. Because of the considerable quantity of heat generated during normal operation of the encapsulated device, it is necessary to provide a path of low thermal impedance from the primary heat source, normally the collector junction, to an appropriate heat sink, thereby effectively to decrease the temperature rise produced at this junction for each watt of dissipated power. In accomplishment of this end the collector electrode lead-in wire or ribbon 15 is provided with a stud 20 to afford intimate thermal coupling between the collector contact and is lead-in electrode.

In the form of the invention illustrated, ohmic contact is made between the stud 20 and the collector contact or pellet of the transistor blank 21, as by soldering. In the mounting of an alloy junction transistor soldering is desirably accomplished by first applying a small amount of suitable flux, for example 2% HCl-propylene glycol flux, to the end of the stud with a glass applicator. Preferably the stud 20 is exactly concentrically aligned with the collector recrystallized region of the transistor, a condition which may be achieved by manual manipulation aided by microscopic examination. The stud and collector contact are then brought into abutment and heat is applied to the stud in amount sufficient to fuse the stud and the collector pellet, care being taken not to totally melt the collector pellet but to heat it sufficiently to insure continuous uninterrupted contact throughout the interfacial area of junction. To facilitate lead attachment to the emitter and base elements of the transistor assembly 14, these elements are, respectively, provided with relatively short, generally U-shaped tabs 22 and 23, the upstanding terminal portions of the tabs being joined, preferably by cold welding procedures, to upwardly presented terminal portions 24 of their respective lead-in electrodes. By providing the coplanar lead-in system shown, the conductor ribbons 15 are each sealed in the common lamina of glass 16, and independently of the assembly of the blank with the stud, thereby permitting optimum reduction in seal thickness and improved dissipation of heat from the unit, factors permitting the fabrication of a hermetically housed semiconductor device of extreme structural compactness.

Figure 3:
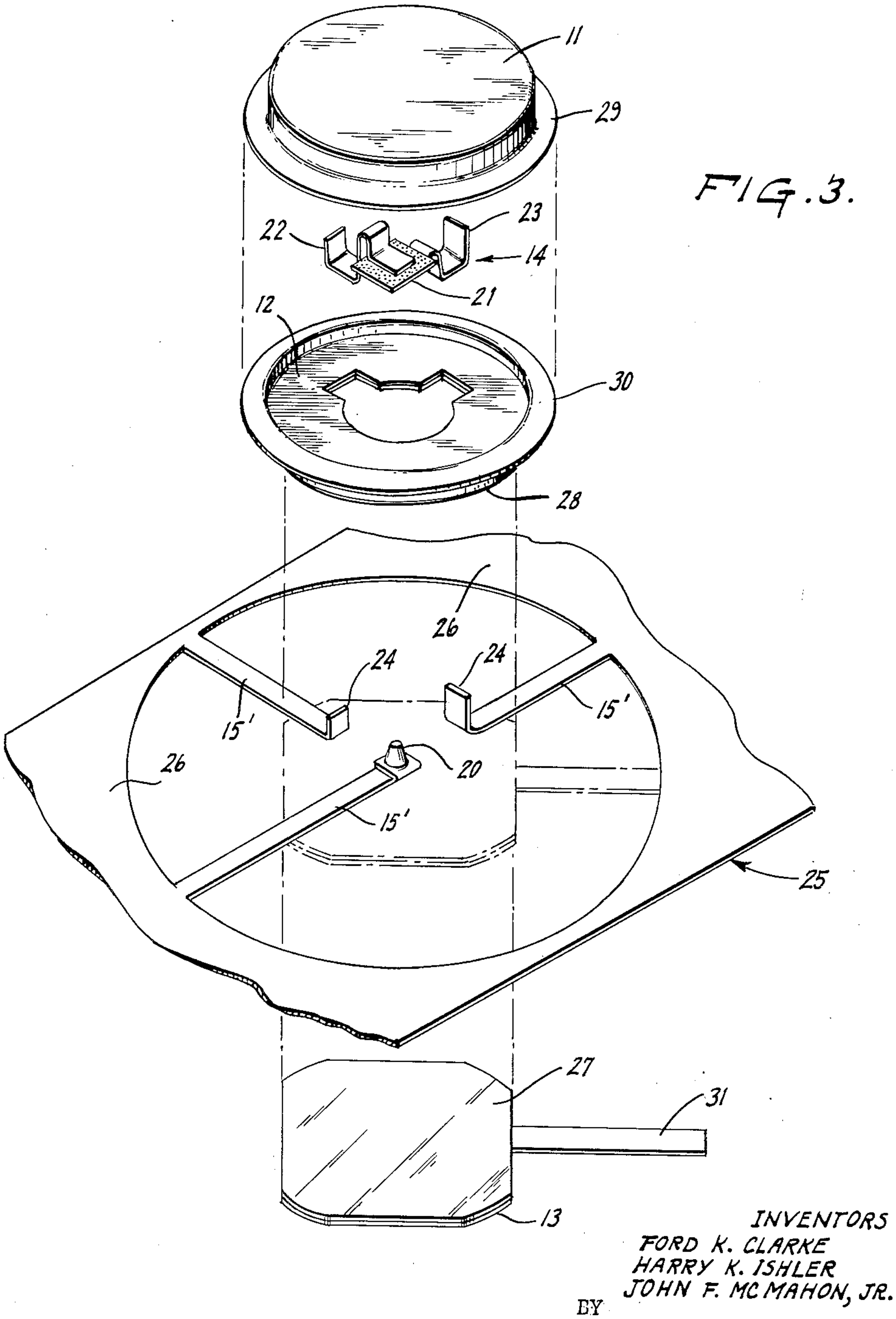
Figure 3 is an exploded view depicting the detailed construction of the novel semiconductor device.

One mode of fabricating the overall assembly, the component parts of which are shown in exploded view in Figure 3, is to first punch or form the component parts from two mil copper foil, copper being preferred because of its excellent thermal and electrical characteristics, the leads 15 being initially formed as an integral subassembly 25 consisting of a plurality of radially disposed ribbon-like elements 15' joined by a common peripheral flange portion 26.

The stud 20 of the collector lead may be formed by dimpling and joined to this stud, normally as the last step prior to encapsulation, is the transistor assembly 14. The lower shield 13 is first brought into abutment with the coplanar lead array 25, the shield taking the position indicated in phantom in Figure 3, with the glass surface 27 contacting the lower surface of each of the leads 15'. The apertured sealing dish 12, its glass-surfaced face 28 directed downwardly, is then lowered into position onto leads 15'. This composite assembly comprising the lead assembly 25 interposed between the glass surfaced lower shield 13 and apertured dish 12, is then heated in an electric oven, or by other suitable means, to sealing temperature, a representative temperature for example, when using a potash, soda-lead glass being in the approximate range of 800–850° C. The resulting fusion produces an integrated assembly in which the leads are encased by the coalescing glass surfaces, the voids between leads being filled through movement of the free flowing glass by capillary-like action.

To facilitate sealing, the copper surfaces are preferably pretreated in accordance with the method of making glass-to-copper seals claimed in copending application Serial No. 760,454 filed September 11, 1958, and assigned to the assignee of the present invention. Briefly stated this method comprises oxidizing surface portions of a body of cold-worked copper to the cupric state under conditions of time and temperature preventing copper recrystallization, and by chemical treatment by any of a number of commercially available formulations. The sheath of cupric oxide thus formed provides a continuous protective film preventing post manufacturing surface contamination. Accordingly the work piece may undergo normal handling after oxidation without fear of contamination or deformation. Following this relatively low temperature oxidation, the glass-to-copper seal may be made by simply bringing the glassing media into intimate contact with the oxidized surface of the copper and heating the assembly to a temperature sufficient to effect hermetic juncture between the glass and copper substrate.

One method of glassing a copper surface treated in accordance with the above method is to make a mixture of alcohol and powdered glass and to spray or paint this mixture onto the surface to be coated, after which the member is fired in conventional fashion, a process which can be repeated, if necessary, until the desired thickness is obtained. However, the interlayer of glass may be provided for in any number of other ways, as for example by dusting hot metal with powdered glass of proper particle size, or by punching glass discs of appropriate size from ribbon stock and then stacking the parts with the glass discs interposed between the metal surfaces 17 and 18, within a suitable firing jig.

On completion of the glass seal, the material bridging leads 15 is removed and the hermetic closure completed by cold welding the top shield 11 to the subassembly, by bringing the flange 29 of this shield into alignment with flange 30 and subjecting their common flange area to a pressure sufficient to induce plastic flow of the confronting metal surfaces to produce an intimate intermingling of the metal. The pressure weld releases no contaminating gases such as a resistance weld might do and consequently there is no harm to the transistor assembly 14.

To insure optimum shielding, the lower shield 13 is provided with an elongate tab 31 which can be bent up under the lower flange 30 in the manner shown in phantom in Figure 2 and joined to the upper shield during cold welding assembly of the unit.

The radially presented, coplanar lead array characterizing this mode of construction insures a hermetically housed semiconductor device of minimal size and excellent heat transmissive properties.

Although the invention has been described with particular reference to specific practice and embodiments, it will be understood by those skilled in the art that the apparatus of the invention may be changed and modified without departing from the essential scope of the invention, as defined in the appended claims.

We claim:

1. A hermetically housed semiconductor device comprising: an apertured enclosure, and an extremely thin laminar structure of glass and metal hermetically sealing the mentioned aperture of said enclosure, the glass lamina having hermetically encased therein in a direction transverse its thickness a plurality of lead-in wires disposed in substantially coplanar array.

2. A hermetically housed semiconductor device comprising an apertured enclosure sealed by an extremely thin laminar plate-like structure of glass and metal, said glass lamina having hermetically encased therein in a direction transverse its thickness a plurality of lead-in wires disposed in substantially coplanar array.

3. An encapsulated semiconductor device, comprising: a body of semiconductive material; an apertured metallic envelope within which said body is housed; and a lamina of glass confronting the apertured portion of said envelope exteriorly of the latter and secured to the envelope to seal the aperture, said lamina being traversed, in a direction transverse its thickness, by a substantially coplanar array of ribbon-like leads terminating within said envelope and electrically connected to said body.

4. An encapsulated semiconductor device, comprising: a body of semiconductive material; an apertured metallic envelope within which said body is housed; a lamina of glass confronting the apertured portion of said envelope exteriorly of the latter and secured to the envelope to seal the aperture, said lamina being traversed, in a direction transverse its thickness, by a substantially coplanar array of ribbon-like leads terminating within said envelope and electrically connected to said body; and a thin sheet of metal of high electrical conductivity and low thermal impedance bounding exposed surface portions of said sheet thereby to provide improved heat dissipation and electrical shielding of said semi-conductor device.

5. A hermetically encapsulated semiconductor device, comprising; a body of semiconductive material, an apertured envelope within which said body is housed, and a lamina of insulating material sealing the mentioned aperture, said lamina being traversed in a direction transverse its thickness by a substantially coplanar array of ribbon-like leads terminating within said envelope and electrically connected to said body.

6. An encapsulated semiconductor device, comprising: a body of semiconductive material; an apertured metallic envelope within which said body is housed; a lamina of insulating material sealing the mentioned aperture, said lamina being traversed in a direction transverse its thickness by a substantially coplanar array of leads terminating within said envelope and electrically connected to said body; and a thin sheet of high electrical conductivity and low thermal impedance bounding surface portions of said lamina thereby to provide improved heat dissipation and electrical shielding of said semi-conductor device.

References Cited in the file of this patent

UNITED STATES PATENTS

| | | |
|---|---|---|
| 2,613,252 | Heibel | Oct. 7, 1952 |
| 2,783,416 | Butler | Feb. 26, 1957 |
| 2,821,691 | Andre | Jan. 28, 1958 |
| 2,879,458 | Schubert | Mar. 24, 1959 |